United States Patent
Degani et al.

(10) Patent No.: US 11,835,616 B2
(45) Date of Patent: Dec. 5, 2023

(54) RADAR SYSTEM AND ITS DIAGNOSTIC METHOD

(71) Applicant: Inxpect S.p.A., Brescia (IT)

(72) Inventors: Alessio Degani, Brescia (IT); Federico Papi, Brescia (IT); Filippo Parrini, Brescia (IT)

(73) Assignee: Inxpect S.p.A., Brescia (IT)

( * ) Notice: Subject to any disclaimer, the term of this patent is extended or adjusted under 35 U.S.C. 154(b) by 380 days.

(21) Appl. No.: 17/153,951

(22) Filed: Jan. 21, 2021

(65) Prior Publication Data

US 2021/0223382 A1     Jul. 22, 2021

(30) Foreign Application Priority Data

Jan. 21, 2020   (IT) .................... 102020000001066

(51) Int. Cl.
  *G01S 13/56*   (2006.01)
  *G01S 7/282*   (2006.01)
  (Continued)

(52) U.S. Cl.
  CPC ............. *G01S 13/56* (2013.01); *G01S 7/282* (2013.01); *G01S 7/285* (2013.01); *G01S 7/4095* (2021.05); *G01S 13/04* (2013.01); *G01S 7/4078* (2021.05)

(58) Field of Classification Search
  CPC .......... G01S 13/56; G01S 7/282; G01S 7/285; G01S 7/4095; G01S 13/04; G01S 7/4078; G01S 7/4039; G01S 7/40; G01S 7/4091
  See application file for complete search history.

(56) References Cited

U.S. PATENT DOCUMENTS

| | | | |
|---|---|---|---|
| 6,526,352 B1* | 2/2003 | Breed | G01S 19/071 |
| | | | 701/470 |
| 2008/0018523 A1* | 1/2008 | Kelly, Jr. | G01S 7/354 |
| | | | 342/21 |

(Continued)

FOREIGN PATENT DOCUMENTS

| | | |
|---|---|---|
| EP | 1681578 A1 | 7/2006 |
| EP | 3502740 A1 | 6/2019 |

OTHER PUBLICATIONS

Rehammar Robert et al; "Design of a Sensor Agnostic FMCW-Compatible Transponder for Automotive Applications" 2018 IEEE Conference On Antenna Measurements & Applications (CAMA), IEEE, Sep. 3, 2018 (Sep. 3, 2018), pp. 1-4, XP033444270, DOI: 10.1109/CAMA.2018.8530595; 4 pages.

(Continued)

*Primary Examiner* — Donald H B Braswell
(74) *Attorney, Agent, or Firm* — Mark Bandy; Rankin Hill & Clark, LLP

(57) ABSTRACT

A radar system is described comprising a transceiver configured to cyclically transmit a first radar signal in a field of view and to cyclically receive a second radar signal from the field of view, and a processing unit configured to process the second radar signal to generate a detection track and detect the presence of a target in the field of view from the detection track. The radar system comprises a marker that can be placed in the field of view and is configured to emit a predetermined reflection signal when impinged upon by said first radar signal and send said predetermined reflection signal to the transceiver. The processing unit is further configured to store a predetermined diagnostic trace, and check whether the predetermined diagnostic track is present in the detection track to thereby determine whether the (Continued)

second radar signal contains the predefined reflection signal and, if not, to indicate a malfunction in the radar system.

11 Claims, 3 Drawing Sheets

(51) Int. Cl.
*G01S 7/285* (2006.01)
*G01S 13/04* (2006.01)
*G01S 7/40* (2006.01)

(56) References Cited

U.S. PATENT DOCUMENTS

| | | | |
|---|---|---|---|
| 2020/0070859 A1* | 3/2020 | Green | B61L 25/025 |
| 2021/0004985 A1* | 1/2021 | Lee | G05D 1/0088 |
| 2021/0096215 A1* | 4/2021 | Slobodyanyuk | H04W 4/38 |

OTHER PUBLICATIONS

Search Report and Written Opinion; dated Oct. 9, 2020; App No. IT 102020000001066; 10 pages.

\* cited by examiner

RADAR SYSTEM AND ITS DIAGNOSTIC METHOD

FIELD

The present invention relates to the field of radar detection. In particular, the invention relates to a radar system with self-diagnostic functions and a method for malfunction diagnostics in a radar system.

BACKGROUND

Radar detection allows targets to be detected in an environment to be monitored, by transmitting, receiving and processing radar signals in the environment, and is therefore used for various applications including detection of intruders in private areas and personnel safety in working environments with hazardous areas.

In certain applications, radar plays a critical role, so a high level of reliability is required. For example, if a person enters an industrial area in which dangerous machinery is operating, the radar can be assigned the task to shut down the machinery. Here, a radar malfunction may cause the machinery to remain in operation, leading to significant hazard for the person who has entered the area.

Timely diagnosis of any kind of radar malfunction is therefore desirable, in view of restoring proper operation or taking any other measure before occurrence of the situation in which radar operation is required.

A few diagnostic or self-diagnostic methods for radar systems are already known, which can check proper operation of individual parts of the system.

Diagnostics of individual parts of a radar system requires a large number of separate checks, depending on radar architecture, and in any case it cannot exclude with reasonable certainty that some unexpected malfunction in some part will not be detected by the checks.

SUMMARY

The difficulties and drawbacks associated with previous approaches are addressed in the present subject matter as follows.

In one aspect, the present subject matter provides a radar system, comprising a transceiver configured to cyclically transmit a first radar signal into a field of view and to cyclically receive a second radar signal from the field of view. The radar system also comprises a processing unit configured to process the second radar signal, to thereby generate a detection track and detect the presence of one or more targets in the field of view from the detection track. A marker adapted to be located in the field of view is configured to receive the first radar signal and to passively reflect a predetermined reflection signal representative of the marker toward the transceiver, when impinged upon by said first radar signal. The processing unit is further configured to store a predetermined diagnostic track representative of the predefined reflection signal, and check whether the predetermined diagnostic track is present in the detection track to thereby determine whether the second radar signal contains the predetermined reflection signal and, if not, to report a malfunction in the radar system.

In another aspect, the present subject matter provides a method of diagnostics of a radar system, comprising placing a marker in a field of view of the radar system, storing a predetermined diagnostic track, and transmitting a first radar signal into the field of view by a transceiver. The method also comprises receiving, by the marker, the first radar signal, and reflecting, by the marker, a predetermined reflection signal toward the transceiver. The method also comprises receiving, by the transceiver, a second radar signal from the field of view. The method also comprises processing the second radar signal, to thereby generate a detection track and detect the presence of targets in the field of view from the detection track. The method additionally comprises checking, when processing the second radar signal, whether the predetermined diagnostic track is present in the detection track to thereby determine whether the second radar signal contains the predetermined reflection signal and, if not, to report a malfunction in the radar system.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

Further features and advantages of the present invention will result more clearly from the illustrative, non-limiting description of a preferred, non-exclusive embodiment of a radar system as shown in the annexed drawings, in which.

DETAILED DESCRIPTION OF THE EMBODIMENTS

Figure 1:
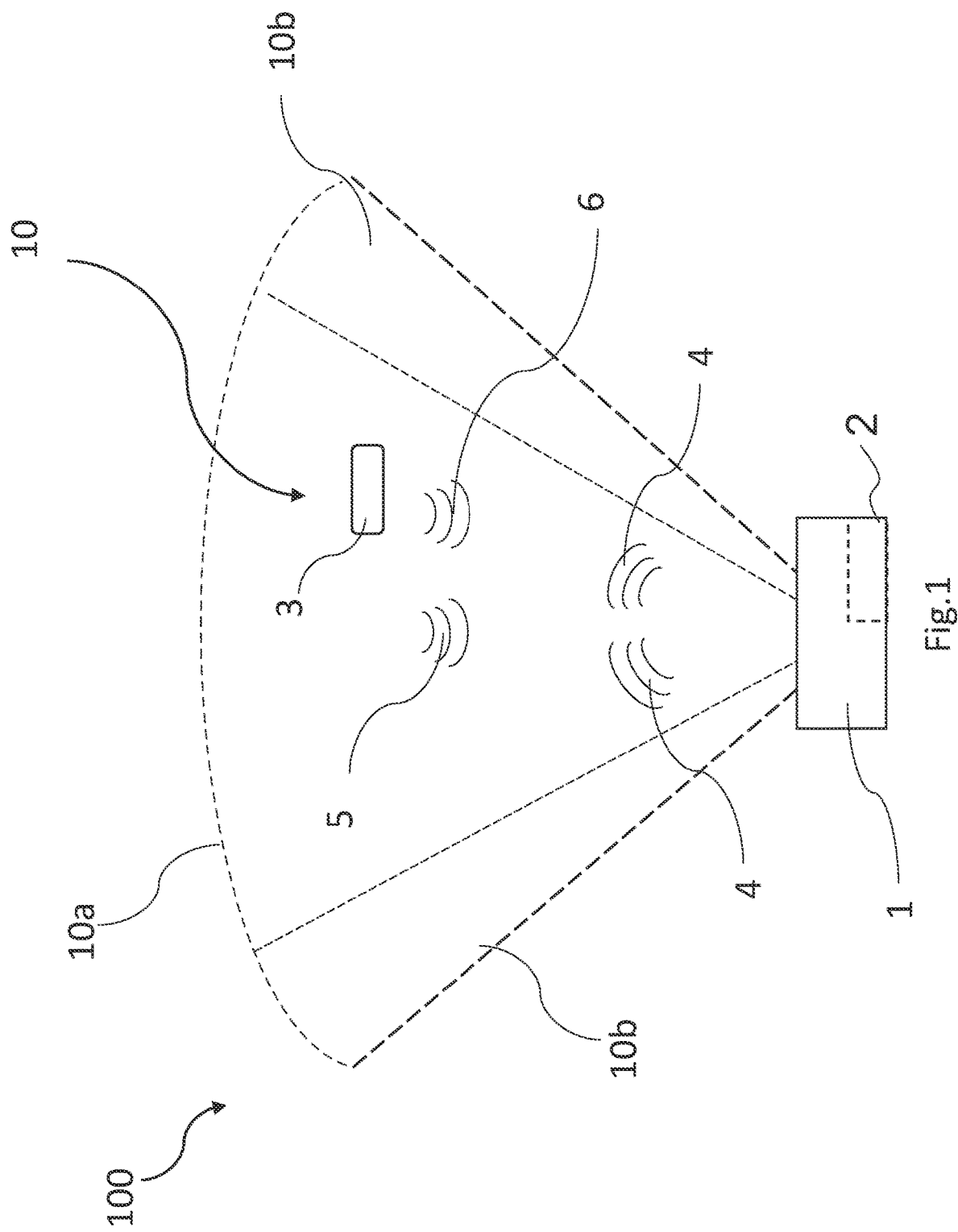
FIG. 1 is a schematic top view of a radar system according to one embodiment of the present invention.
Figure 2:
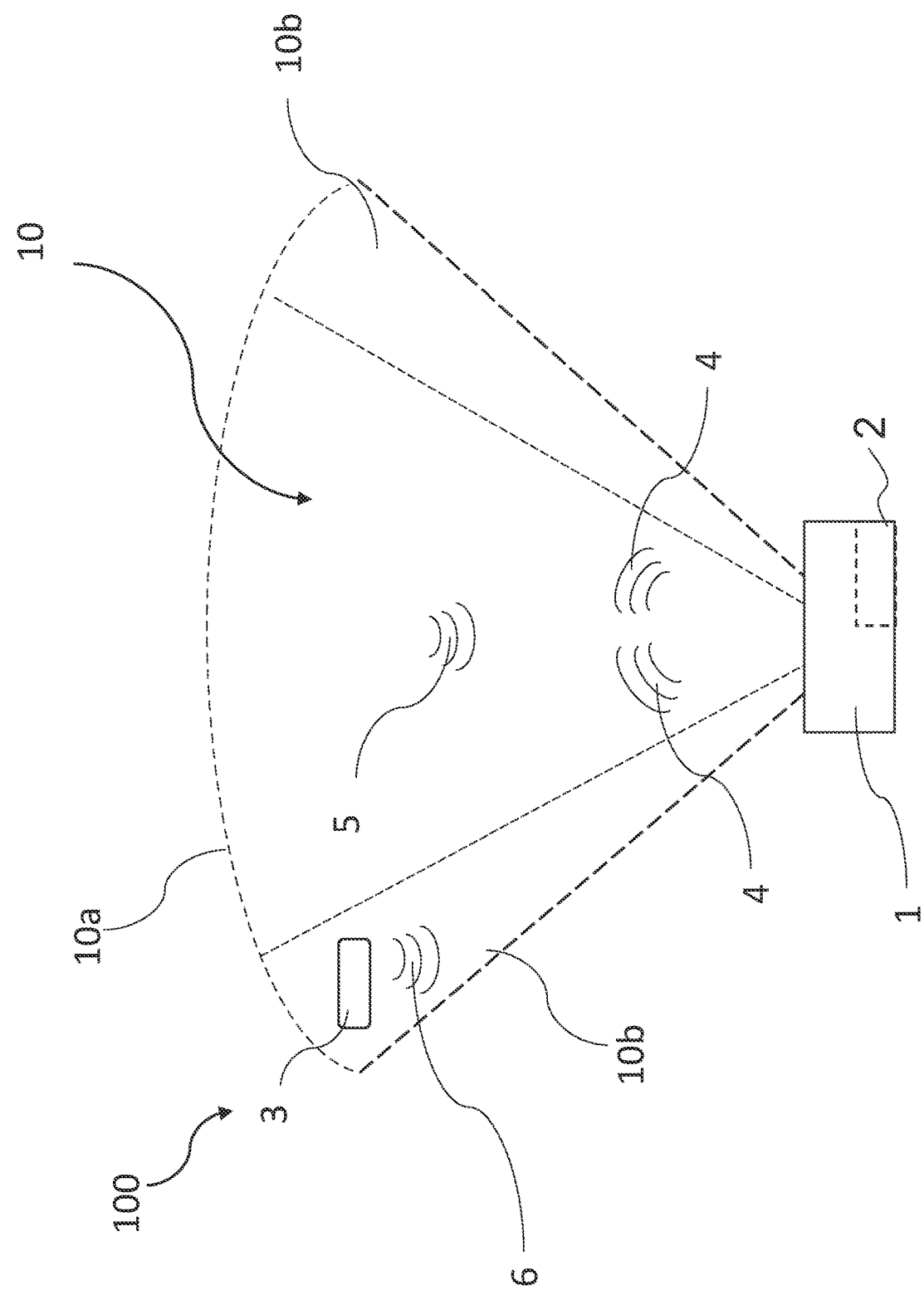
FIG. 2 is a schematic top view of a radar system according to one embodiment of the present invention.
Figure 3:
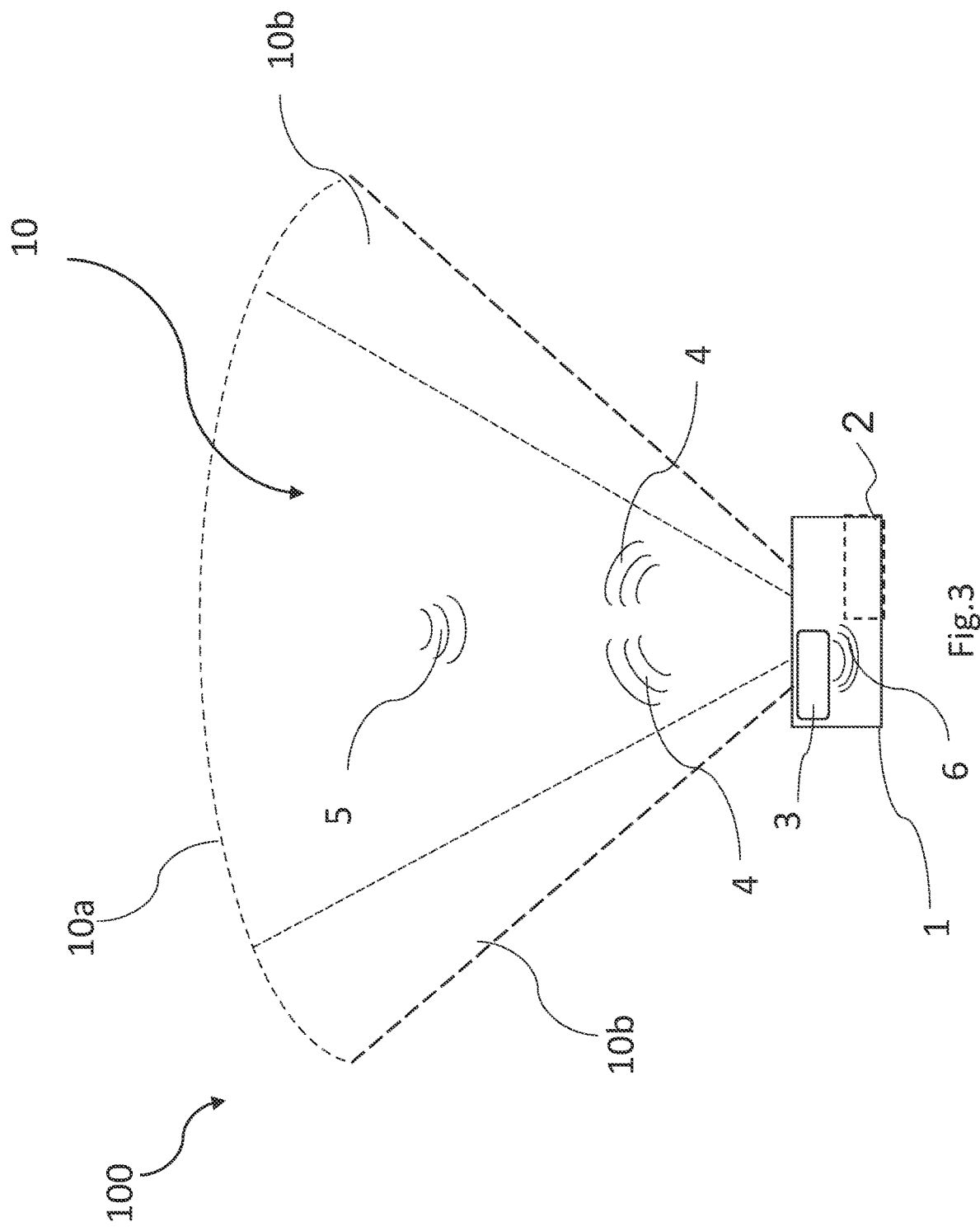
FIG. 3 is a schematic top view of a radar system according to one embodiment of the present invention.

The main object of the present invention is to obviate the above discussed drawbacks of the prior art, and in particular to provide general diagnostic of a radar system that will not miss any kind of malfunction, even those that are difficult to predict during design.

This and other objects are fulfilled by a radar detection system for radar detection and a radar system diagnostic method as defined in any of the accompanying claims.

In particular the invention includes placing a marker in the field of view of the radar. As the marker is impinged upon by the signal transmitted in the environment, it reflects a specific signal, back to the radar transceiver. As the signal received by the transceiver is being processed, a check may be made to assess whether the predetermined reflection signal is present, mixed with the rest of the radar signal from the environment, and used for target recognition.

A predetermined diagnostic track related to the predetermined reflection signal is stored beforehand. Therefore, while processing the signal collected by the transceiver, a radar system malfunction is indicated if the track expected to be left by the predetermined reflection signal cannot be found.

Advantageously, any kind of malfunction upstream from the signal transmission, during transmission and reception of the signal, or during later conditioning of the collected signal, will cause a mismatch between the predetermined reflection signal and the diagnostic track, and will be indicated.

Although no information is provided about the specific malfunctioning part, this method is therefore very effective in recognizing malfunctions of different types. The search for the diagnostic trace from processing of the second radar signal substantially uses the process that was used to detect the targets.

More in detail, in normal processing of the collected signal, a detection trace, such as a signal spectrum, is generated and the analysis of the detection trace allows target identification using known techniques. Then, the diagnostic trace of the invention is searched for in the same detection trace, like the targets. Therefore, the predetermined reflection signal is recognized as a target with particular characteristics that must match the diagnostic track.

Therefore, it will be highly unlikely to find fault conditions in which target detection is not possible, but a correct diagnostic track is found in the detection track, or vice versa, correct operating conditions in which the predetermined reflection signal does not generate the diagnostic track.

In the preferred embodiment, the marker comprises one or more reflectors which emit a predetermined echo signal, or reflection signal, when impinged upon by the signal spread from the transceiver. Since most radars determine the distance of a target based on the time delay between transmission and reception of the signal, the predetermined reflection signal is interpreted as a target in a predetermined position, characterized by a known signal amplitude. Alternatively, the predefined reflection signal is interpreted as a diagnostic target when the marker imparts a characteristic, hence known, Doppler component to the reflection signal.

It should be noted that these effects can be obtained with a marker consisting of a simple passive device, which is thus highly reliable.

Appropriate synchronization with the remaining parts of the radar system allows use of diagnostic traces varying with different detection cycles, according to predetermined repetition schemes, which are easily distinguishable from the remaining signal shares which must in any case be analyzed for target identification. In addition, the presence of the predetermined reflection signal may be limited to those detection cycles in which the diagnostic function is to be performed, without disturbing target detection in the other cycles.

Further characteristics and advantages of the invention will be recognizable by a skilled person from the following detailed description of a few exemplary embodiments.

A radar system 100 comprises a transceiver 1, configured, as is known in the art, to cyclically transmit a first radar signal 4 into a field of view 10 and to cyclically receive a second radar signal 5 from the field of view 10. It should be noted that the second radar signal 5 is generated by one or more reflections in the field of view 10 of the first radar signal 4. Therefore, each target and/or object in the field of view 10 defines a share of the second radar signal 5. For example, the transceiver 1 may comprise one or more transceiving antennas, and each of the transceiving antennas may be configured to transmit the first radar signal 4 only, to receive the second radar signal 5 only, or both.

The radar system further comprises a casing which contains the transceiver 1, and optionally additional components, some of which will be specified below.

The radar system further comprises a processing unit 2 in signal communication with the transceiver 1, which can be housed in the casing. The processing unit 2 is configured to process the second radar signal 5, to thereby cyclically generate a detection track and detect the presence of targets in the field of view 10 from the detection track.

This processing is known per se and depends on the characteristics with which the first radar signal 4 is generated and transmitted. Generally, processing involves establishing a predetermined correspondence between time delays occurring between the transmission of the first radar signal 4 and the reception of shares of the second radar signal 5, and origin distances of the shares of the second radar signal 5 from the transceiver 1.

Thus, when the first radar signal 4 impinges upon a target in the field of view 10, it is reflected thereby, thereby generating a share of the second radar signal 5 that reaches back to the transceiver 1 with a respective time delay. Therefore, the second radar signal 5 comprises the shares originating from reflections from different targets, in addition to inevitable noise shares. The following description will illustrate that in the second radar signal 5 of the invention will also include a share consisting of a predetermined reflection signal.

The predetermined correspondence is naturally connected to the time of flight of the first and second radar signals 5, and therefore their propagation speed or the alteration of the near field. Nevertheless, the step of establishing the correspondence between time delays and distance of the targets shall not be understood to necessarily include calculating the time delay in a specific step but can be implicitly established by calculations that directly provide the distance from other data of the second radar signal 5 detected by the transceiver 1. The same applies to alteration of the near field.

In general, in addition to distances, the processing unit 2 may be configured to also determine further positional parameters of the targets, such as azimuth and elevation angles, according to known techniques, not described herein.

Preferably, the processing unit 2 is configured to move between a detection configuration during which it is configured to detect the presence of targets and a diagnostic configuration during which it is configured to indicate a malfunction, as best described below. More preferably, the processing unit 2 is configured to cycle between the detection configuration and the diagnostic configuration to check the operation of both the transceiver 1 and the marker 3 itself. It should be noted that the processing unit 2 may be configured to continue detection of targets in the field of view 10 even during the diagnostic configuration. In other words, during the diagnostic configuration, while the processing unit 2 checks for the presence of the share of the marker 3, it is configured to indicate a malfunction of the system while preferably detecting the presence of targets in the field of view 10. On the other hand, detection configuration refers to a mode in which the malfunction is not indicated. For example, during the detection configuration, the second radar signal 5 may still also contain the share of the marker 3, but while the processing unit 2 receives this share, it detects the presence of targets without indicating the malfunction.

Here, the radar system of the invention comprises a marker 3 that can be located in the field of view 10 of the transceiver 1, which has the purpose to carry out diagnostic tasks. In certain embodiments, the marker 3 is placed inside the casing. In other embodiments, the marker 3 is placed outside the casing and is spaced from the casing. In either case, the distance of the marker 3 from the transceiver 1 will be referred to as marker distance 3.

It should be noted that the field of view 10 may contain a monitored region 10a of higher interest than the other regions of the field of view 10. For example, the monitored region 10a may correspond to the region of the field of view 10 adjacent to dangerous machinery, which does not occupy the entire field of view 10 or a specific area of a home. Therefore, the processing unit 2 may be configured, for example, to indicate detected targets in the monitored region 10a but not to indicate detected targets outside the monitored region 10a. Preferably, the field of view 10 can be divided into the monitored area 10a and the controlled area 10b outside the monitored area 10a.

The marker 3 may have a disturbing effect on normal target detection. Therefore, with monitored regions of high interest, it, the marker 3 will preferably, but not necessarily, be outside the monitored region 10a, also according to which of the embodiments as discussed below will be implemented, as some of them have higher or lower noise levels. For these reasons, the marker 3 may be activated, i.e. enabled to reflect the first radar signal 4, or deactivated, i.e. prevented from reflecting the first radar signal 4. It should also be noted that, when the marker 3 is placed in the vicinity of the transceiver 1 inside the casing, it alters the near field of the transceiver 1, once again emitting a predetermined reflection signal.

It should be noted that, according to the preferred embodiments, when the marker 3 is placed inside the monitored area 10a or inside the controlled area, it is preferably cyclically activated and deactivated to emit the predetermined reflection signal during the diagnostic configuration only. Preferably, when the marker 3 is placed inside the controlled area 10b it remains activated both during the detection configuration and during the diagnostic configuration.

The marker 3 is configured to receive the first radar signal 4 and to reflect a predetermined reflection signal 6 toward the transceiver 1 when impinged upon by the first radar signal 4. This operation may be carried out at each detection cycle, or preferably only in a first plurality of cycles. Preferably, the marker 3 comprises an outer surface configured to be hit by the first radar signal 4. In particular, the predetermined reflection signal 6 is emitted by the reflection of the first radar signal 4 on the outer surface of the marker 3.

According to a preferred embodiment, the marker 3 comprises one or more radar reflectors configured to generate the predetermined reflection signal 6 when hit by the first radar signal 4. Thus, the marker 3 performs the passive function of reflecting the first radar signal 4 by emitting a predetermined reflection signal 6 that can be detected inside the second radar signal 5 received by the transceiver 1.

According to a preferred embodiment, the marker 3 is configured to impart a Doppler component to the predetermined reflection signal 6 that can be recognized by said processing unit 2. Preferably, the marker 3 comprises rotation members configured to rotate the reflectors about an axis of rotation. Thus, the Doppler component is imparted to the predetermined reflection signal 6. The rotation members are configured to impart a cyclic movement to said reflectors thereby providing a Doppler component to the predetermined reflection signal 6 when the marker 3 is activated.

It should be noted that the Doppler effect is imparted on the default reflection signal 6 during both the detection configuration and during the diagnostic configuration, or only during the diagnostic configuration. This depends on the location of the marker 3 in the field of view 10. For example, by imparting the Doppler component only during the diagnostic configuration, interference and/or errors may be reduced during detection, which is therefore preferred when the marker 3 is located in the monitored area 10a and/or in the casing. However, when the marker 3 is placed in the controlled area 10b, i.e. at a predetermined distance from the casing, the Doppler component can be imparted during both the detection configuration and during the diagnostic configuration, by having the processing unit 2 check for the presence of the share of the marker 3.

As an alternative to the previous embodiment, the marker 3 is configured to move between a first position in which the one or more radar reflectors are shielded from the first radar signal 4 and a second position in which the one or more reflectors reflect the first radar signal 4. Preferably, in the first position the marker 3 is invisible to the radar irrespective of its location in the field of view 10 inside or outside the casing, or outside the field of view 10. On the other hand, in the second position the marker 3 is visible to the radar as it can be impinged upon by the first radar signal 4.

For example, the marker 3 can be pulled out of a receptacle located inside a wall, inside the ground and/or the casing itself. Preferably, the marker 3 comprises moving members configured to move the marker 3 and its one or more reflectors between the first position and the second position. For example, the moving members comprise a mechanical and/or electrical actuator configured to pull the marker 3 out of a receptacle when it is activated and retract it when it is deactivated. In this embodiment, the marker 3 moves from the first position to the second position as a function of the movement from the detection configuration to the diagnostic configuration. In particular, the marker 3 is in the first position during the detection configuration and in the second position during the diagnostic configuration.

It should be noted that both in the embodiment in which a Doppler component is imparted and in the alternative embodiment in which the marker 3 is shielded, the latter comprises an electronic control unit associated with the processing unit 2. The control unit is configured to activate and deactivate the marker 3 by selectively activating and deactivating the rotation members or the moving members as a function of the movement of the data processing unit 2 from the standard detection configuration to the diagnostic configuration and vice versa.

According to an alternative embodiment, the marker 3 comprises both the rotation members and the moving members as described above.

According to a preferred embodiment, the marker 3 and the processing unit 2 may be synchronized. Preferably they may be in signal communication with each other and the processing unit 2 may be configured to activate the diagnostic configuration, during a first plurality of cycles in which the first radar signal 8 is transmitted, and to move to the detection configuration during a second plurality of cycles in which the first radar signal 8 is transmitted.

Alternatively, the alternation of the different pluralities of cycles may be managed by a master unit in signal communication with the marker 3 and the processing unit 2, or in less advantageous embodiments by an operator who manually instructs the two devices to activate the desired configuration. It should be noted in any case that the term processing unit 2 shall not be understood to be restricted to embodiments in which processing is carried out by a single physical device, but different functions of the processing unit may be carried out by separate hardware elements.

It shall be also noted that, during the diagnostic configuration, the processing unit 2 will preferably run a predetermined number of successive diagnostic cycles, followed by a plurality of successive cycles in which the processing unit 2 moves to the detection configuration. The duration of each sequence of diagnostic cycles, for example 10 ms, is preferably less than the duration of each sequence of non-diagnostic cycles, for example 10 s. Therefore, the predetermined number of detection configuration cycles is greater than the predetermined number of diagnostic configuration cycles, preferably at least 10 times, and even more preferably at least 100 times as much. Nevertheless, embodiments are also possible in which the diagnostic mode is always active, or in any case is active for a time similar to the time of the non-diagnostic mode.

Periodic activation of the diagnostic mode allows the marker 3 to be compatible with positioning even within monitored areas of high interest of the field of view 10.

Once the predetermined reflection signal 6 is generated, it is collected by the transceiver 1 with all the other shares of the second radar signal 5.

During processing of the second radar signal 5, according to the invention the processing unit 2 is configured to determine whether the second radar signal 5 contains the predetermined reflection signal 6. In the embodiments in which periodic switching between the diagnostic configuration and the detection configuration occurs, the check is only carried out only in the diagnostic configuration, i.e. during the first plurality of cycles and not during the second plurality of cycles.

For this purpose, the processing unit 2 is configured to store a predetermined diagnostic track. Preferably, the diagnostic track is stored by processing the second radar signal 5, and in particular by selecting a share of the detection track corresponding to the predetermined reflection signal 6, during one or more calibration cycles preceding the subsequent cyclic operation of the radar.

More in detail, in at least one calibration cycle the marker 3 is active and is already placed in the field of view 10 in the position it will maintain during the subsequent regular operation. Normal processing of the second radar signal 5, as described above, leads to association of different distances from the transceiver 1 and/or a characteristic Doppler component with different shares of the second radar signal 5.

In this calibration cycle a characteristic share of the second radar signal 5 is determined to be originated from the predetermined reflection signal 6. This characteristic share is received by the transceiver 1 with a characteristic time delay which corresponds, according to the predetermined correspondence, to a characteristic distance from the transceiver 2 and/or the characteristic Doppler component. The characteristic distance and a characteristic signal amplitude taken by this share (or a distribution of characteristic signal amplitudes over a range of characteristic distances) are stored as the diagnostic track to be searched for in the subsequent cycles.

During this calibration cycle, the selection of the correct share may be made by an operator in charge of calibration, may be calculated based on the characteristics and position of the marker 3, or may be automatically determined by comparison of different calibration cycles. For example, the characteristic share may be stored based on the difference between the shares of the second radar signal 5 recognized in a calibration cycle in which the marker 3 is active, and the shares of the second radar signal 5 recognized during a calibration cycle in which the marker 3 is not active.

All these calibration operations can be repeated through several cycles, and the results obtained may be averaged to obtain more precise values, optionally introducing thresholds to define admissible and inadmissible deviations from the diagnostic trace stored for the subsequent cycles.

With the diagnostic track stored, during normal operation, preferably in the detection configuration, a check may be made, when processing the second radar signal 5, on whether the predetermined diagnostic track can be recognized by the second radar signal 5. This operation implies, for example, checking whether the various shares of the second radar signal 5 include a share located in the position of the diagnostic track, i.e. the characteristic position or the characteristic Doppler component, and having substantially the same amplitude as the diagnostic track, i.e. the characteristic amplitude.

If they do, then the predetermined reflection signal 6 is actually present in its correct form inside the second radar signal 5, and therefore the generation of the first radar signal 4, the reception of the second radar signal 5, and their processing were carried out correctly, at least until the steps required to recognize the diagnostic track, i.e. assignment of the origin distances in the field of view 10 and/or the characteristic Doppler component to the shares of the second radar signal 5.

Otherwise, i.e. when no significant share of the second radar signal 5 is detected for the characteristic distance of the diagnostic track or the characteristic Doppler component or when a share whose amplitude is significantly different from the characteristic amplitude, then not all the aforementioned conditions have occurred. Therefore, the processing unit 2 is configured to indicate a malfunction in the radar system.

This may be the case, for example, when the first radar signal 4 is not generated, and therefore the marker 3 generates no predetermined reflection signal 6. Alternatively, this may be the case when the predetermined reflection signal 6 exists but has a frequency, an amplitude and/or a phase other than those expected due to errors in the generation or transmission of the first radar signal 4. It should be noted that in the case of frequency alterations, processing of the second radar signal 5 leads to assignment of a distance other than the characteristic distance to the share of the predetermined reflection signal 6.

Also, the predetermined reflection signal 6 may happen to be correct, but malfunctions in reception or subsequent processing thereof may cause it not to be recognized to correspond to the diagnostic track.

Finally, failure to recognize the presence of the diagnostic track may be caused by a malfunction that does not occur in the transceiver 1 or the processing unit itself, but in the marker 3. This is of course a less critical fault condition, since the targets can be still detected but it is in any case important to recognize also the possibility of a failure of the diagnostic system.

In any of these scenarios, i.e. when the diagnostic track cannot be recognized in the detection track by the second radar signal 5, the processing unit 2 is configured to indicate a malfunction in the radar system.

Concerning the characteristic distance which is detected both in the calibration cycles and in the subsequent cycles of normal operation, it should be noted that it may or may not correspond to the actual marker distance 3.

This is due to the fact that, as already explained, the processing unit 2 establishes a correspondence between time delays in the reception of the shares of the second radar signal 5 and distances of origin of the shares. Nevertheless, this correspondence is generally valid for radar signals which are reflected in a substantially instantaneous manner when they impinge upon a target.

The diagnostic method for the radar system will be now described. It will be appreciated that the steps of the method substantially correspond to what has already been described concerning signal exchanges and processing of the radar system. The same considerations will apply. Furthermore, all the processing operations and signal exchanges as described above may form steps of the method even where not expressly indicated below.

The method first comprises placing the marker 3 in the field of view 10 of the radar system, inside or outside the casing that contains the transceiver 1.

Therefore, the method includes storing a predetermined diagnostic track, preferably during one or more calibration cycles. Depending on the embodiments, a first and a second diagnostic tracks may be stored.

An additional step consists in transmitting a first radar signal 4 into the field of view 10 by a transceiver 1.

The first radar signal 4 is received by the marker 3, namely by one or more reflectors. At least one predetermined reflection signal i6 is emitted by the marker 3 to the transceiver 1.

The predetermined reflection signal 6 is obtained as a function of the type of marker 3 in use. In particular, it is obtained as a function of the position of the marker 3 and the presence or absence of a characteristic Doppler component and/or a characteristic amplitude.

Then, the method comprises receiving, by the transceiver 1, a second radar signal 5 from the field of view 10, a share whereof is given by the predetermined reflection signal 6.

This is followed by the step of processing the second radar signal 5, to thereby generate a detection track and detect the presence of targets in the field of view 10 from the detection track, Finally, in the cycles in which the processing unit 2 is in the diagnostic configuration, processing the second radar signal 5 comprises checking whether the predetermined diagnostic track is present in the detection track, to thereby determine whether the second radar signal 5 contains the predetermined reflection signal 6. If it is not present, a malfunction in radar system is indicated.

A skilled person may obviously envisage a number of equivalent changes to the above discussed variants, without departure from the scope defined by the appended claims.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A radar system, comprising:
a transceiver configured to cyclically transmit a first radar signal into a field of view and to cyclically receive a second radar signal from the field of view, and
a processing unit configured to process the second radar signal, to thereby generate a detection track and detect the presence of one or more targets in the field of view from the detection track,
wherein:
a marker adapted to be located in the field of view is configured to receive the first radar signal and to passively reflect a predetermined reflection signal representative of the marker toward the transceiver, when impinged upon by said first radar signal, the marker comprising one or more radar reflectors configured to generate the predetermined reflection signal when hit by said first radar signal, the marker being configured to alternate between:
a first position in which said one or more radar reflectors are shielded from the first radar signal, and
a second position in which said one or more radar reflectors reflect the first radar signal,
and wherein the processing unit is further configured to:
store a predetermined diagnostic track representative of the predefined reflection signal, and
check whether the predetermined diagnostic track is present in the detection track to thereby determine whether the second radar signal contains the predetermined reflection signal and, if not, to report a malfunction in the radar system.

2. The radar system as claimed in claim 1, wherein said processing unit is configured to alternate between a detection configuration and a diagnostic configuration, said processing unit being configured to report a malfunction only during the diagnostic configuration.

3. The radar system as claimed in claim 2, wherein the marker is configured to add a Doppler component to said predetermined reflection signal.

4. The radar system as claimed in claim 3, wherein:
the marker comprises one or more radar reflectors configured to generate the predetermined reflection signal when hit by said first radar signal; and
rotation members configured to rotatably drive said one or more radar reflectors about an axis of rotation and to add said Doppler component to said predetermined reflection signal.

5. The radar system as claimed in claim 4, wherein the marker comprises control electronics associated with said processing unit and configured to turn said rotation members on and off as the data processing unit alternates from the standard detection configuration to the diagnostics configuration and vice versa.

6. The radar system as claimed in claim 4, wherein the marker is configured to add said Doppler component:
during the detection configuration and during the diagnostic configuration of said processing unit, or
during the diagnostic configuration only.

7. The radar system as claimed in claim 1, wherein:
said processing unit is configured to alternate between a detection configuration and a diagnostic configuration, said processing unit being configured to report a malfunction only during the diagnostic configuration; and
the marker is in the first position during the detection configuration and in the second position during the diagnostic configuration.

8. The radar system as claimed in claim 1, wherein the marker comprises:
moving members configured to move said marker between said first position and said second position.

9. The radar system as claimed in claim 8, wherein:
said processing unit is configured to alternate between a detection configuration and a diagnostic configuration, said processing unit being configured to report a malfunction only during the diagnostic configuration; and
the marker comprises control electronics associated with said processing unit and configured to turn said moving members on and off as the data processing unit alternates from the detection configuration to the diagnostics configuration and vice versa.

10. The radar system as claimed in claim 1, further comprising a casing that contains the transceiver, wherein the marker is placed in the casing, or the marker is placed outside the casing, at a distance from the casing.

11. A method of diagnostics of a radar system, the method comprising:
   placing a marker in a field of view of the radar system, the marker comprising one or more radar reflectors configured to generate a predetermined reflection signal when hit by a first radar signal, the marker being configured to alternate between:
      a first position in which said one or more radar reflectors are shielded from the first radar signal, and
      a second position in which said one or more radar reflectors reflect the first radar signal,
   storing a predetermined diagnostic track,
   transmitting a first radar signal into the field of view by a transceiver,
   receiving, by the marker, the first radar signal, and reflecting, by the marker, a predetermined reflection signal toward the transceiver,
   receiving, by the transceiver, a second radar signal from the field of view,
   processing the second radar signal, to thereby generate a detection track and detect the presence of targets in the field of view from the detection track,
   checking, when processing the second radar signal, whether the predetermined diagnostic track is present in the detection track to thereby determine whether the second radar signal contains the predetermined reflection signal and, if not, reporting a malfunction in the radar system.

* * * * *